United States Patent Office 2,768,731
Patented Oct. 30, 1956

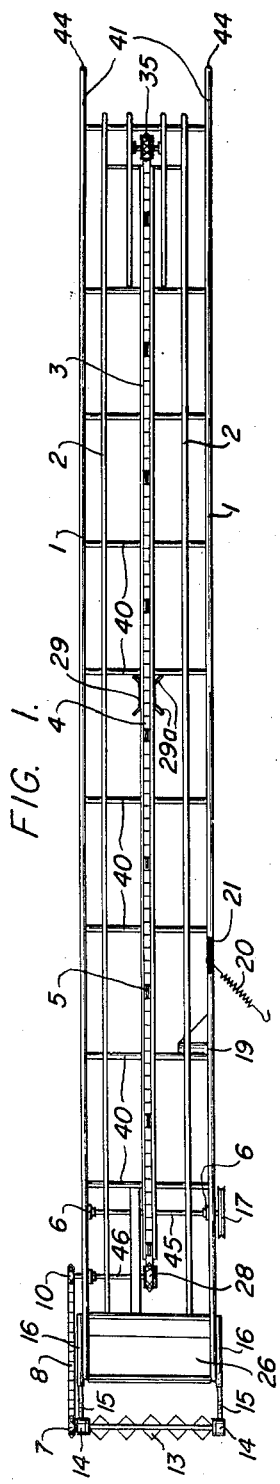

2,768,731

TRANSPORTABLE CONVEYOR IMPLEMENT FOR LOADING AND UNLOADING PURPOSES

Joseph Boyer Anderson, Salt Lake City, and Leo Vett Anderson, Midvale, Utah

Application August 3, 1953, Serial No. 371,786

4 Claims. (Cl. 198—126)

Our invention relates to conveyor implements for handling baled hay, straw, and a variety of other materials, particularly in the loading of same for transport and the unloading thereof at a destination.

A principal object of the invention is to provide such a conveyor implement that can be easily and securely carried with the load during transport of the latter from place to place, thereby avoiding the common practice of trailing the conveyor behind the load on a set of road wheels provided especially for the purpose.

Other objects are to accomplish the above by a lightweight, economical construction that enables manual handling of the implement in all positions, including operation on top of a load or stack; to provide a pick-up loader and stacker which will efficiently do the work of two machines and at a price to the user that both large and small operators can afford; to provide a pick-up attachment which, when attached to the bumper of a truck, can be used in the field to pick up bales from the ground and elevate them onto the truck for hauling; and to provide an elevator that a user can have with him at all times and places, without inconvenience.

These objects are accomplished by the utilization of an elongate skid frame defining upper and lower skid surfaces between which essentially all of the operating mechanism is disposed, such skid frame having one of its ends convergent to form a load-penetrating pilot, so that the implement may be pushed into position between loaded bales for secure transportation and extracted therefrom with a minimum of effort and inconvenience; also, by the utilization of drive mechanism for the conveyor portion of the implement that includes telescopic motor-mounting means enabling the motor to be quickly and conveniently removed from the implement in preparing the latter for transport or in converting from gasoline power to electric power and vice versa.

Further objects and features of the invention will become apparent from the following detailed description of the particular preferred form thereof illustrated in the accompanying drawing.

In the drawing:

Fig. 1 represents a top plan view of the conveyor implement with optional pick-up attachment, the motor and its mounting assembly having been removed for transport purposes, but the anchoring spring having been left to indicate how it is attached in use;

Fig. 2, an elevation of the motor mounting side of the implement, the pick-up attachment having been removed;

Fig. 3, a fragmentary elevation of the opposite side of the conveyor implement as it appears in Fig. 2;

Fig. 4, a detail view in top plan of the chain return guide shown in Figs. 1 and 2, the view being drawn to a considerably enlarged scale;

Fig. 5, an end view of the chain return guide of Fig 4;

Fig. 6, a fragmentary view in front elevation of an optional mounting bracket for the conveyor implement attached to the bumper of an automotive vehicle for pick-up loading in the field;

Fig. 7, a rear elevation of the motor and its mounting assembly, shown detached from the conveyor implement proper and drawn to approximately the same scale as Figs. 1 and 2;

Fig. 8, a side elevation of the motor and its mounting assembly as it appears looking from the right in Fig. 7; and Fig. 9, a detail view in top plan of the motor-mounting base plate with telescopic mounting member, as it appears in position for mounting on the conveyor implement of Figs. 1 and 2.

Referring now to the drawing:

The conveyor implement proper includes a lightweight skid frame made up of a pair of elongate, similarly configurated, sub-frame components indicated 1, respectively, rigidly secured together in mutually spaced, side-by-side relationship within mutually parallel planes by a series of mutually spaced and transversely extending structural members, here shown as bars 40. Such skid frame is preferably of welded tubular construction, as illustrated.

Each of the component sub-frames 1 has an upper skid rail 1a and a lower skid rail 1b, Figs. 2 and 3, which are spaced apart mutually within a common plane to define, along with the corresponding skid rails of the other sub-frame component, respective upper and lower, longitudinally continuous, substantially unobstructed, skid surfaces 41 and 42, respectively, for the implement. The upper and lower skid rails of each component sub-frame 1 are preferably formed of structural tubing reinforced by a longitudinal series of mutually spaced struts 43.

In the construction illustrated, such upper and lower skid rails of each component sub-frame and the skid surfaces 41 and 42 defined thereby merge at the forward end of the implement to form an outwardly convergent, load-penetrating pilot 44 for the implement, the lateral sides of which are mutually parallel. Such pilot end for the skid frame enables the implement to be readily pushed between stacked bales loaded for transportation, whereby the implement is embedded in the load for secure and safe transportation.

An endless conveyor, for example, the illustrated chain belt conveyor 4, is operably mounted within the confines of the skid frame and entirely between the skid surfaces 41 and 42 thereof. Drive mechanism for such endless conveyor is located at that end of the skid frame which lies opposite the load-penetrating pilot end 44 thereof, and includes a shaft and pulley assembly extending transversely of the skid frame.

In the particular construction illustrated, the structural bars 40 support a pair of longitudinally extending, transversely spaced, elongate bars 2, whose upper surfaces define a conveyor deck lying below the level of the upper skid rails 1a. The upper run of the conveyor 4 is disposed in such conveyor deck, extending longitudinally thereof between the bars 2. For accommodating and guiding such upper run of the conveyor, a structural channel 3 is secured to the upper surfaces of the transversely extending structural bars 40, as by welding.

The drive mechanism comprises a countershaft 45 journaled in bearings 6 and carrying a pulley 17 at one of its ends, which projects beyond the skid frame for the purpose. The pulley 17 is belted to the motor when the latter is mounted on the skid frame as described hereinafter, and countershaft 45 serves to drive conveyor chain belt 4 through the intermediacy of shaft 46, sprocket 28, sprockets 12 and 9, and sprocket chain 11, see Fig. 3. Sprocket 12 is fast on the opposite end of countershaft 45, and is connected to sprocket 9 by sprocket chain 11. Sprocket 9 is fast on shaft 46, as is also sprocket 28. Conveyor chain belt 4 passes directly around and interengages the teeth of sprocket 28.

The opposite end of conveyor chain belt 4 extends around and interengages the teeth of an idler sprocket 35, which is mounted in conventional fashion, see Fig. 1, for taking up slack in the conveyor when necessary.

The conveyor chain belt 4 is provided with protruding lug attachments 5 at intervals along its length, so as to be capable of engaging bales or other material to be conveyed along the conveyor deck.

In order to prevent the lower run 4a of the conveyor from sagging and possibly engaging structure or materials adjacent the bottom skid surface 42 of the implement, a chain return guide 29 is provided intermediate the length and the depth of the skid frame.

As here shown, see especially Figs. 4 and 5, such chain return guide 29 comprises an elongate box structure depending from securement, as by welding, to chain guide channel 3. Such box structure is open ended, for passage of the lower conveyor run 4a therethrough. It is advantageously provided with outwardly flaring wings 29a at such open ends, for better guiding the received lower conveyor run.

Within the box structure is a table 23, whose top desirably has downwardly-turned, tapered ends 23a. The lower conveyor run 4a rests on top of such table.

The chain guide structure is claimed in our copending divisional application Serial No. 608,032, filed September 5, 1956, entitled "Chain Return Device for Endless Chain Conveyors."

One of the principal purposes of the invention is to enable the motor to be easily and quickly removed from and replaced on the implement proper, so that the implement may be easily and safely transported and so that it may be readily converted from gasoline operation to electrical operation and vice versa. To this end, a motor-mounting member formed as one mating part of a pivotal, telescopic mount for an independent motor assembly, is secured to and extends transversely of the skid frame in spaced parallel relation to the shaft of the aforedescribed shaft and pulley assembly and between such shaft and the pilot end 44 of the skid frame. So as not to interfere with the functional purposes of the skid surfaces 41 and 42 of the skid frame, such motor-mounting member is disposed wholly within and between the same.

In the construction illustrated, such motor-mounting member takes the form of a relatively short length of structural tubing 19, open at its ends for telescopically receiving a mating member projecting from the independent motor assembly about to be described, and preferably welded into position at an appropriate location wholly within and between the skid surfaces 41 and 42. Preferably, and as here shown, motor-mounting member 19 does not project laterally of the skid frame.

The independent motor assembly may be of any suitable construction. The motor may be electrically or gasoline driven. Its drive shaft, here indicated 25, is provided with a drive pulley, here indicated 25a. In this illustrated construction, such motor is secured, as by bolting, to a base plate 22 (see Fig. 9), from which projects a cylindrical member 18 formed to pivotally mate with the tubular mounting member 19 of the skid frame. In the illustrated instance, telescopic member 18 is adapted to fit within and to be telescopically received by the tubular telescopic member 19.

Whatever the arrangement of these two telescopically mating parts, however, the engagement therebetween is freely pivotal about the axis of the two parts. In this way, not only may the independent motor assembly be easily and quickly mounted and dismounted with respect to the conveyor implement proper, but the belting connection (not shown) between motor drive pulley 25a and conveyor pulley 17 may be conveniently tensioned as required for proper operation.

In order to protect the motor assembly against rough handling, it is advantageous that it be encircled by a framework made up of rings 24 of structural tubing.

In the assembled and operating relationship of the conveyor implement proper and its independent motor assembly, means are provided for temporarily anchoring such motor assembly to the skid frame. It is advantageous that an elongate flexible retainer be utilized as such anchoring means, to provide a yieldable connection between motor and skid frame so disposed as to maintain belt tightness during operation. The anchoring means here shown comprises a spring 20, Fig. 1, having opposite ends adapted to hook onto the skid frame and the motor assembly, respectively, at locations serving to maintain belt tension. For convenience, a securement plate 21, provided with a series of hook-receiving openings 21a, is attached to the skid frame at a suitable location, such as that shown.

A bale pick-up attachment may be optionally provided, as indicated in Fig. 1. For this purpose, a sprocket 10 is fixed to the outer end of shaft 46. As illustrated, the attachment comprises a bale-lifting rotor 13 carried by bearings 14 secured to respective projecting members 15 which telescope into respective tubes 16 secured to the conveyor-drive end of the skid frame. Rotor 13 carries a sprocket 7 that is connected in driven relationship with sprocket 10 by a sprocket chain 8. Following insertion of the members 15 in the receiving tubes 16, the attachment is pulled out sufficiently to tension sprocket chain 8, and pins (not shown) are dropped into registering receiving holes provided in the members 15 and in tubes 16 for securing the attachment in operating position.

For utilizing such pick-up attachment to best advantage, an automotive bumper bracket is provided, see Fig. 6. This advantageously comprises an angular bracket having an extending arm 33, for receiving and supporting the pick-up end of the implement, and an attachment arm 33a. The attachment arm is adjustably secured in a T fitting 31 by means of a set screw 32, the T fitting being secured to the projecting end of a mounting member 30 secured to the bumper 34 of an automotive vehicle.

The conveyor implement of Figs. 1, 2, and 3 is advantageously provided with oppositely disposed registering openings 27 for receiving arm 33. Securement is completed by a key or cotter pin 47.

The pick-up end of the conveyor implement is advantageously provided with a skid shoe 26 extending transversely thereacross.

We claim:

1. A conveyor implement, comprising a skid frame having a pair of elongate substantially similarly configurated sub-frame components, and structural means rigidly securing said sub-frame components together in mutual spaced, side-by-side relationship within mutually parallel planes; each sub-frame component having an upper skid rail and a lower skid rail which are substantially coextensive and are spaced apart mutually within a common plane to define, along with the corresponding skid rails of the other sub-frame component, respective upper and lower, longitudinally continuous, substantially unobstructed, skid surfaces for said implement; the upper and the lower skid rails of each sub-frame component and the said skid surfaces merging at at least one end of said frame to form an outwardly convergent, load-penetrating pilot for said implement whose lateral sides are mutually parallel; an endless conveyor operably mounted within the confines of said skid frame and entirely between the said skid surfaces thereof; drive mechanism for said endless conveyor located at the end of said skid frame opposite said load-penetrating pilot end thereof, said mechanism including a shaft and pulley assembly extending transversely of said skid frame; and a motor mounting member secured to and extending transversely of said skid frame, in spaced parallel relation to said shaft and between the latter and the said pilot end of said skid frame and lying wholly within and between the said skid surfaces, said motor mounting member being formed as one mating part of a pivotal, telescopic mount for an independent motor assembly.

2. A conveyor implement, comprising a skid frame having a pair of elongate substantially similar configurated sub-frame components, and structural means rigidly securing said sub-frame components together in mutually spaced, side-by-side relationship within mutually parallel planes; each sub-frame component having an upper skid rail and a lower skid rail which are substantially coextensive and are spaced apart mutually within a common plane to define, along with the corresponding skid rails of the other sub-frame component, respective upper and lower, longitudinally continuous, substantially unobstructed, skid surfaces for said implement; the upper and the lower skid rails of each sub-frame component and the said skid surfaces merging at at least one end of said frame to form an outwardly convergent, load-penetrating pilot for said implement whose lateral sides are mutually parallel; an endless conveyor operably mounted within the confines of said skid frame and entirely between the said skid surfaces thereof; drive mechanism for said endless conveyor located at the end of said skid frame opposite said load-penetrating pilot end thereof, said mechanism including a shaft and pulley assembly extending transversely of said skid frame; a motor mounting member secured to and extending transversely of said skid frame, in spaced parallel relation to said shaft and between the latter and the said pilot end of said skid frame and lying wholly within and between the said skid surfaces, said motor mounting member being formed as one mating part of a pivotal, telescopic, attachment mount; an independent motor assembly carrying the other mating part of said attachment mount, the latter being telescoped with respect to said one mating part in freely pivotal relationship; and means temporarily anchoring said motor assembly to said skid frame.

3. The conveyor implement of claim 2, wherein the anchoring means comprises an elongate, flexible retainer disposed between and attached at its ends to the motor mounting member and the skid frame, respectively.

4. The conveyor implement of claim 3, wherein the flexible retainer is a spring.

References Cited in the file of this patent
UNITED STATES PATENTS

| | | |
|---|---|---|
| 2,501,332 | Heer | Mar. 21, 1950 |
| 2,533,882 | Ensinger | Dec. 12, 1950 |
| 2,600,028 | Steffen | June 10, 1952 |
| 2,620,934 | Smoker | Dec. 9, 1952 |
| 2,653,721 | Cantrell | Sept. 29, 1953 |